United States Patent
Marhefka et al.

(10) Patent No.: US 7,231,846 B2
(45) Date of Patent: Jun. 19, 2007

(54) MAGNETIC FLUID SHIFTER DAMPER MECHANISM

(75) Inventors: Joseph John Marhefka, Northampton, PA (US); Richard Alan Binkley, Easton, PA (US)

(73) Assignee: Mack Trucks, Inc., Allentown, PA (US)

( * ) Notice: Subject to any disclaimer, the term of this patent is extended or adjusted under 35 U.S.C. 154(b) by 301 days.

(21) Appl. No.: 10/924,935

(22) Filed: Aug. 25, 2004

(65) Prior Publication Data

US 2006/0042412 A1    Mar. 2, 2006

(51) Int. Cl.
*B60K 20/00*    (2006.01)

(52) U.S. Cl. .................. 74/473.21; 74/473.28; 188/267

(58) Field of Classification Search ............... 74/473.1, 74/473.21, 473.26, 473.28, 473.29, 519, 74/522.5, 523; 188/267, 267.2, 267.1
See application file for complete search history.

(56) References Cited

U.S. PATENT DOCUMENTS

| | | | |
|---|---|---|---|
| 1,981,428 A | | 11/1934 | Schneider |
| 4,307,623 A | | 12/1981 | Cavallero et al. |
| 4,323,356 A | * | 4/1982 | Stephenson .................. 440/96 |
| 4,916,966 A | * | 4/1990 | Weishaupt et al. ........ 74/473.29 |
| 4,955,935 A | * | 9/1990 | Katayama ................. 74/473.21 |
| 5,179,867 A | | 1/1993 | Sakakibara et al. |
| 5,182,964 A | * | 2/1993 | Gellner ......................... 74/523 |
| 5,275,065 A | * | 1/1994 | Ruiter ....................... 74/483 R |
| 5,396,973 A | | 3/1995 | Schwemmer et al. |
| 5,921,142 A | * | 7/1999 | Peter ........................... 74/491 |
| 5,974,856 A | * | 11/1999 | Elie et al. .................. 73/11.04 |
| 6,009,982 A | | 1/2000 | Agnihotri et al. |
| 6,067,871 A | | 5/2000 | Markyvech et al. |
| 6,105,453 A | | 8/2000 | Ooyama et al. |
| 6,308,813 B1 | * | 10/2001 | Carlson ................... 192/220.3 |
| 6,419,058 B1 | | 7/2002 | Oliver et al. |
| 6,427,813 B1 | | 8/2002 | Carlson |
| 6,477,911 B1 | | 11/2002 | Thoreson |
| 6,508,139 B2 | | 1/2003 | Onodera |
| 6,513,404 B1 | | 2/2003 | Haringer |
| 6,575,049 B1 | | 6/2003 | Hasegawa |
| 2002/0139212 A1 | | 10/2002 | Dejonge |
| 2002/0139214 A1 | | 10/2002 | Fujiwara et al. |
| 2005/0261094 A1 | * | 11/2005 | Foster et al. ................. 474/113 |

* cited by examiner

*Primary Examiner*—David M. Fenstermacher
(74) *Attorney, Agent, or Firm*—Martin Farrell

(57) ABSTRACT

A magnetic fluid shifter damper mechanism for a vehicle transmission may include a shift linkage having a first position and a second position, a magnetic fluid damper disposed between a substantially fixed point and a support point on the shift linkage, a fluid inside the magnetic fluid damper resisting substantially a motion of the support point relative to the substantially fixed point in the presence of a magnetic field, wherein the magnetic field is applied substantially to the fluid when the shift lever is in substantially the first or the second position, and wherein the magnetic field is removed substantially from the fluid when the shift lever is substantially between the first and the second position.

28 Claims, 3 Drawing Sheets

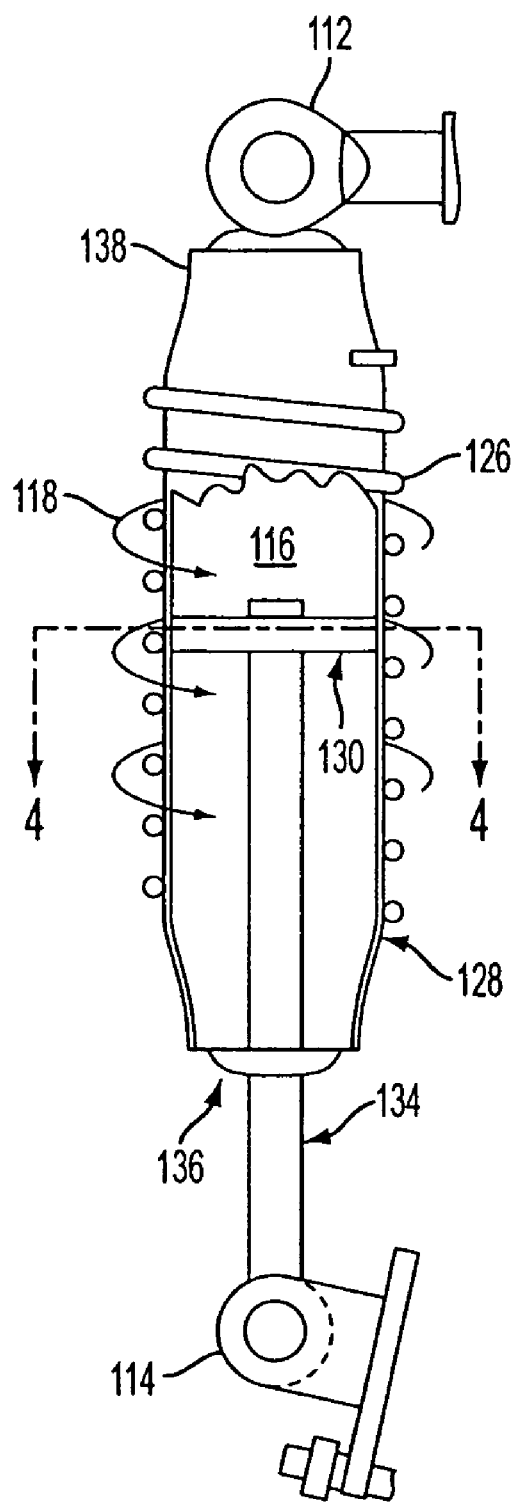
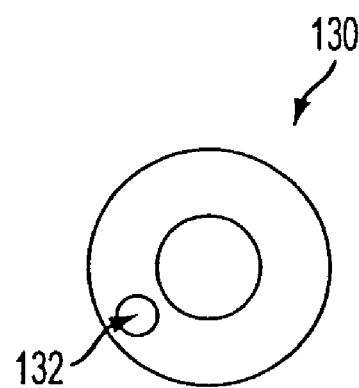
FIG. 3
FIG. 4

MAGNETIC FLUID SHIFTER DAMPER MECHANISM

BACKGROUND OF THE INVENTION

1. Field of the Invention

The invention relates to the field of vehicle transmission shift systems.

2. Description of the Related Art

A common problem with vehicles equipped with manual transmissions is transmission shift lever jump-out (i.e., unintended disengagement of a gear ratio). A transmission may jump out of gear when the vehicle travels over bumpy roads or railroad crossings. Shifters ought to be designed to shift with minimal effort. Such a shifter, however, may be particularly susceptible to disengagement if the chassis is subject to resonances due to bumps in the road. There is a need for a transmission shift system that is responsive and easy to shift, yet is not prone to disengagement.

SUMMARY OF THE INVENTION

A primary object of the invention is to overcome the deficiencies of the related art described above by providing a magnetic fluid shifter damper mechanism for a vehicle transmission. The present invention achieves these objects and others by providing a magnetic fluid shifter damper mechanism for a vehicle transmission.

In several aspects, the invention may provide a magnetic fluid shifter damper mechanism for a vehicle transmission. In particular, in a first aspect a magnetic fluid shifter damper mechanism for a vehicle transmission may include a shift linkage having a first position and a second position, a magnetic fluid damper disposed between a substantially fixed point and a support point on the shift linkage, a fluid inside the magnetic fluid damper resisting substantially a motion of the support point relative to the substantially fixed point in the presence of a magnetic field, wherein the magnetic field is applied substantially to the fluid when the shift linkage is in substantially the first or the second position, and wherein the magnetic field is removed substantially from the fluid when the shift linkage is substantially between the first and the second position.

In a second aspect, a method of magnetic fluid damping a shifter mechanism for a vehicle transmission may include the steps of applying a magnetic field to a fluid of a magnetic fluid damper to hold a shift linkage in a first position, releasing substantially the magnetic field, moving the shift linkage to substantially a second position, and applying substantially the magnetic field to the fluid of the magnetic fluid damper to hold the shift linkage in substantially the second position.

In a third aspect, a system for magnetic fluid damping a shifter mechanism for a vehicle transmission may include means for applying a magnetic field to a fluid of a magnetic fluid damper to hold a shift linkage in a first position, means for releasing substantially the magnetic field, means for moving the shift linkage to substantially a second position, and means for applying substantially the magnetic field to the fluid of the magnetic fluid damper to hold the shift linkage in substantially the second position.

In a fourth aspect, a magnetic fluid shifter damper mechanism may include a rail having a first positional detent groove located at a first position on the rail and a second positional detent groove located at a second position on the rail, a positional detent pin adapted to fit substantially within the first or second positional detent groove when the rail is in the first or second position, and a biasing device that urges the positional detent pin against the rail and into the first or second positional detent groove, a magnetic fluid damper disposed between a substantially fixed point and a support point on the positional detent pin, a fluid inside the magnetic fluid damper resisting substantially a motion of the support point relative to the substantially fixed point in the presence of a magnetic field, wherein the magnetic field is applied substantially to the fluid when the positional detent pin is in substantially the first or the second position, and wherein the magnetic field is removed substantially from the fluid when the positional detent pin is substantially between the first and the second position.

The above and other features and advantages of the present invention, as well as the structure and operation of various embodiments of the present invention, are described in detail below with reference to the accompanying drawings.

BRIEF DESCRIPTION OF THE SEVERAL VIEWS OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein:

FIG. 3 is a side view, partially cut-away, of the magnetic fluid damper shown in FIG. 1;

FIG. 4 is a section through a drag element of the magnetic fluid damper shown in FIG. 3;

DETAILED DESCRIPTION OF THE PREFERRED EMBODIMENTS

It would be desirable for a shifter to be light-weight, inexpensive to produce, and responsive without compromising unduly a gear-holding ability of the shifter. It would further be desirable if a shifter could be modified aftermarket to reduce a propensity toward disengagement. It would further be desirable if a transmission could be modified efficiently by a manufacturer to reduce a propensity toward disengagement. It would further be desirable if a shifter could be held in a particular gear until an operator touched the shifter, at which point the shifter would be free to move to another gear. It would further be desirable for a shifter to offer variable resistance to movement, so that shifter feel could be tailored to an operator's preference. Finally, it would be desirable if a shifter could be substantially prevented from being inadvertently shifted into a reverse gear while a vehicle was moving forward.

Figure 1:
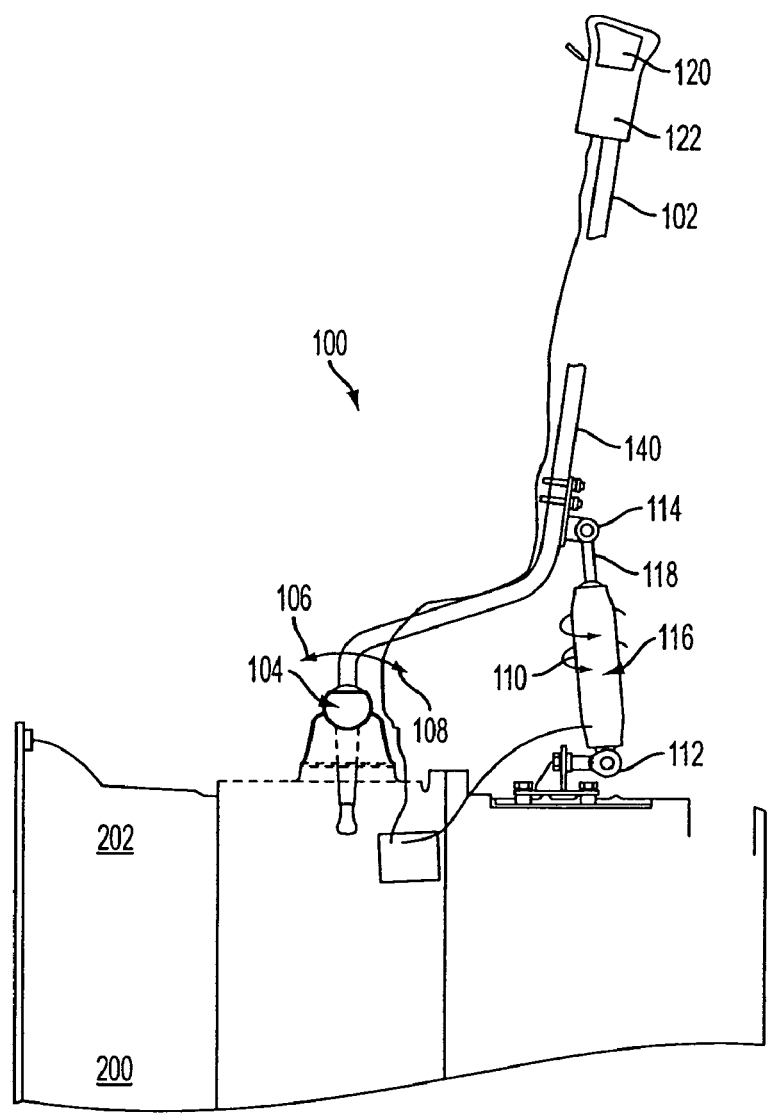
FIG. 1 is a side view of a magnetic fluid shifter damper mechanism for a vehicle transmission according to a first embodiment of the invention.

In FIG. 1 is shown a magnetic fluid shifter damper mechanism 100 for a vehicle transmission 200 according to a first embodiment of the invention. Magnetic fluid shifter damper mechanism 100 may include a shift linkage 102. Shift linkage 102 may have a first position 106 and a second position 108. In one embodiment, shift linkage 102 may be a shift lever 140 having a pivot 104. Pivot 104 may be a ball joint or a revolute joint, or a combination of revolute joints with axes of rotation substantially orthogonal to each other.

Figure 2:
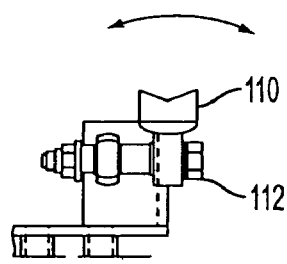
FIG. 2 is a rear view of a magnetic fluid shifter damper mechanism for a vehicle transmission according to the embodiment shown in FIG. 1.

In one embodiment, shift lever 140 may rotate forward and backward around pivot 104, as in the case of an automatic transmission 200. In this embodiment first and second positions 106, 108 may be points along an arc described by shift lever 140. In an alternative embodiment, shown in FIG. 2, shift lever 140 may rotate side-to-side around pivot 104 as well as forward and backward, as in the case of a manual transmission 200. In this embodiment, shift lever 140 may move substantially in an "H" pattern, or in several "H" patterns adjacent to each other. In this embodiment first and second positions 106, 108 may be points at the ends of the "H" pattern described by shift lever 140.

A magnetic fluid damper 110 may be disposed between a substantially fixed point 112 and a support point 114 on shift lever 140 substantially distal from pivot 104. In several embodiments, magnetic fluid damper 110 may be a shock absorber, a snubber, or a dashpot. In one embodiment, substantially fixed point 112 may be a point on a housing 202 of transmission 200, or on a bracket associated with housing 202. In this embodiment, fixed point 112 may be fixed in translation, but capable of rotation. Magnetic fluid damper 110 may be mounted between a housing 202 of vehicle transmission 200 and shift lever 140 via ball joints on both ends. In several embodiments, substantially fixed point 112 and support point 114 comprise ball joints or revolute joints, such as a combination of several revolute joints each allowing rotation about a separate axis.

The mounting orientation of magnetic fluid damper 110 may be in-line with the highest stick offset and shift lever 140 travel, typically in the fore-aft direction, thereby causing magnetic fluid damper 110 to expand and contract with forward and rearward shifting and simply rotate side to side with sideways shifting.

In one embodiment, shown in FIG. 3, magnetic fluid damper 110 may contain a fluid 116, such as a magneto-rheological (MR) fluid. A magneto-rheological fluid may be composed of small soft-magnetic particles dispersed in a liquid carrier, such as hydraulic fluid. The particles may be spherical particles of carbonyl iron having mean diameters of between about 0.1 µm to 400 µm, and more preferably between about 1 µm and 100 µm.

A magneto-rheological fluid exhibits a thickening behavior (a rheology change), sometimes referred to as an "apparent viscosity change", in the presence of magnetic field 118 of sufficient strength. The higher the strength of magnetic field 118, the higher the viscosity, and hence the greater the resistance to motion of support point 114 relative to substantially fixed point 112.

Magnetic fluid damper 110 may also include an electromagnet 126 to apply a magnetic field 118 to fluid 116. In several embodiments, electromagnet 126 may be a coil, like an inductive coil or a wound-wire coil, or a solenoid. Electromagnet 126 may be disposed proximate to fluid 116 to apply magnetic field 118. In this embodiment, electromagnet 126 may be disposed or incorporated in a wall of magnetic fluid damper 110.

In one embodiment, a viscosity of fluid 116 may change in the presence of magnetic field 118. In this embodiment, fluid 116 may become substantially solid or very viscous in the presence of magnetic field 118. Conversely, in the absence of magnetic field 118, fluid 116 may have a viscosity similar to that of motor oil. Therefore, when electromagnet 126 is activated, fluid 116 will be in a high viscosity state, and when electromagnet 126 is not activated, fluid 116 will be in a low viscosity state. In one embodiment, fluid 116 can change viscosity in a matter of milliseconds.

Fluid 116 inside magnetic fluid damper 110 may resist substantially a motion of support point 114 relative to substantially fixed point 112 in the presence of a magnetic field 118. In alternative embodiments, magnetic field 118 may be an electromagnetic field or simply an electric field. In one embodiment, fluid 116 may be a magneto-rheological fluid 116. In particular, magnetic fluid damper 110 provides variable resistance to motion of support point 114 relative to substantially fixed point 112 through fluctuations in magnetic field 118.

In one embodiment, magnetic fluid damper 110 may require only a small electrical current (typically several amps or less) and thus not present a potential shock hazard. Furthermore, magnetic fluid damper 110 may operate at low voltage (typically 12 volts or less), and thus be compatible with an automotive electrical system.

In one embodiment, magnetic fluid damper 110 may include a cylinder 128 containing fluid 116. In this embodiment, a drag element 130 may be disposed to move longitudinally in cylinder 128, immersed in fluid 116, as shown in FIG. 4. Drag element 130 may have a vent aperture 132 to vent fluid 116 through drag element 130 as it moves. An arm 134 may be fixed to drag element 130 and protrude from an upper end 136 of cylinder 128. In one embodiment, an end of arm 134 may be pivotably connected to support point 114, and a lower end 138 of cylinder 128 may be pivotably connected to substantially fixed point 112. In one embodiment, electromagnet 126 may be incorporated in a wall of cylinder 128.

Drag element 130 may be dragged through fluid 116 when arm 134 is moved relative to cylinder 128. When magnetic field 118 is applied to fluid 116 it may be in a high viscosity state. A large amount of force may consequently be required to move fluid 116 through vent aperture 132 of drag element 130. Therefore, magnetic fluid damper 110 may exhibit a high resistance state when magnetic field 118 is applied to fluid 116, since significant force may be required to expand or contract magnetic fluid damper 110.

When magnetic field 118 is released, on the other hand, fluid 116 may be in a low viscosity state. In this case only a small amount of force may be required to move fluid 116 through vent aperture 132 of drag element 130. Therefore, magnetic fluid damper 110 exhibits a low resistance state when magnetic field 118 is not applied to fluid 116, since significant force is not required to expand or contract magnetic fluid damper 110.

In an alternative embodiment, magnetic fluid damper 110 may be a rotary damper. A rotary damper may be applied to an automatic transmission-type shift lever 140 that moves forward and backward. A rotary damper could be composed of two plates rotating about an axis. Vanes on one or the other of the plates could run in a magneto-rheological fluid. In this way the viscosity of fluid 116 in which the vaned plates run could be adjusted by applying magnetic field 118 to fluid 116. If one plate was fixed to the transmission housing and the other plate was fixed to shift lever 140, a resistance to motion of shift lever 140 could be varied by varying the strength of magnetic field 118 in substantially the same manner as that described above for the linear embodiment of magnetic fluid damper 110.

In one embodiment, magnetic field 118 may be applied substantially to fluid 116 when shift lever 140 is in substantially first position 106 or second position 108. In this embodiment, magnetic field 118 may be removed substantially from fluid 116 when shift lever 140 is substantially between first position 106 and second position 108.

In one embodiment, magnetic fluid damper 110 could receive an input from a vehicle speed sensor. If the input from the vehicle speed sensor indicated that a vehicle in which transmission 200 was installed was moving forward, magnetic fluid damper 110 could prevent or resist transmission 200 from being shifted into reverse. In this embodiment, magnetic field 118 may be applied substantially to fluid 116 when a vehicle in which transmission 200 was installed was moving forward, and the operator attempted inadvertently to shift transmission 200 into a reverse gear.

In one embodiment, a switch 120 may control magnetic field 118. In this embodiment, switch 120 may be disposed at a control end 122 of shift lever 140. In one embodiment, switch 120 may be a touch sensitive switch 122. In this embodiment, touch sensitive switch 122 may detect contact between an operator and switch 120.

In one embodiment, shift lever 140 has a shift knob at control end 122 for engagement by a hand of a driver. In one embodiment, the shift knob comprises touch sensitive circuitry and conductive metal areas. The touch sensitive circuitry is operably connected to electromagnet 126 to control magnetic field 118. When the touch sensitive circuitry does not detect contact between a hand of a driver and the shift knob, it causes electromagnet 126 to generate magnetic field 118. This puts fluid 116 into a high viscosity state. If, on the other hand, the touch sensitive circuitry detects contact between a hand of a driver and a shift knob, the circuitry instructs electromagnet 126 to not generate magnetic field 118.

Since, during normal driving, a driver does not touch the shift knob, electromagnet 126 is generating magnetic field 118 in fluid 116, fluid 116 is in a high viscosity state, magnetic fluid damper 110 is in a high resistance state, and the shift lever 140 is held firmly in gear. When a driver shifts gears, on the other hand, he engages the shift knob with a hand, electromagnet 126 does not generate magnetic field 118 in fluid 116, fluid 116 is in a low viscosity state, and magnetic fluid damper 110 is in a low resistance state. Magnetic fluid damper 110 remains in a low resistance state as long as the driver's hand remains on the shift knob; therefore, shift lever 140 is responsive and free flowing, allowing for easy shift lever 140 motion to the intended gear.

In an alternative embodiment, switch 120 may be a pressure transducer, such as a strain gauge applied to a side of shift lever 140, in the manner of a "drive-by-wire" system. In this embodiment, switch 120 could measure a bending or a deformation of shift lever 140 and release magnetic field 118 if the measured deformation indicates the operator wishes to move shift lever 140 but fluid damper 110 is resisting the movement. In another embodiment, shifter damper mechanism 100 may have a fail safe mode in which magnetic field 118 is released if a predetermined pressure is placed on shift lever 140. In another embodiment, shifter damper mechanism 100 may have a fail safe mode in which magnetic field 118 is not applied, so the viscosity of fluid 116 stays low.

In a second embodiment, a method of magnetic fluid 116 damping a shifter mechanism for a vehicle transmission 200 may include the steps applying a magnetic field 118 to a fluid 116 of a magnetic fluid damper 110 to hold a shift lever 140 in a first position 106, releasing substantially magnetic field 118 that was applied to fluid 116 of a magnetic fluid damper 110 to hold shift lever 140 in first position 106, moving shift lever 140 to substantially a second position 108, and applying substantially magnetic field 118 to fluid 116 of magnetic fluid damper 110 to hold shift lever 140 in substantially second position 108.

In one embodiment, magnetic field 118 may be applied to a fluid 116 of magnetic fluid damper 110 to hold a shift lever 140 in a first position 106 by breaking contact with shift lever 140. In one embodiment, magnetic field 118 may be substantially released by establishing contact with a shift lever 140 in first position 106.

In one embodiment, magnetic fluid damper 110 could be used in combination with other means of retaining a transmission in a gear, such as detents on the shift rail. This embodiment may be appropriate in a situation where an operator could touch the gear shift lever inadvertently, such as when reaching for something, to prevent the transmission from being thrown out of gear.

Figure 5:
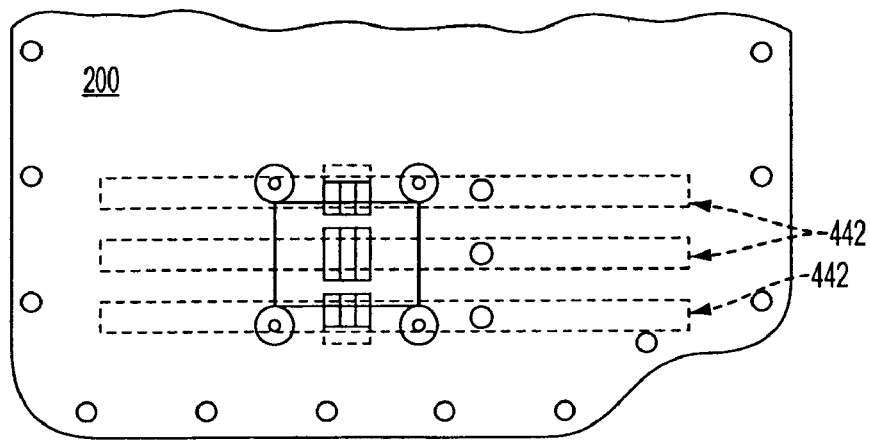
FIG. 5 is a top view of a magnetic fluid shifter damper mechanism for a vehicle transmission according to a fourth and a fifth embodiments of the invention.
Figure 6:
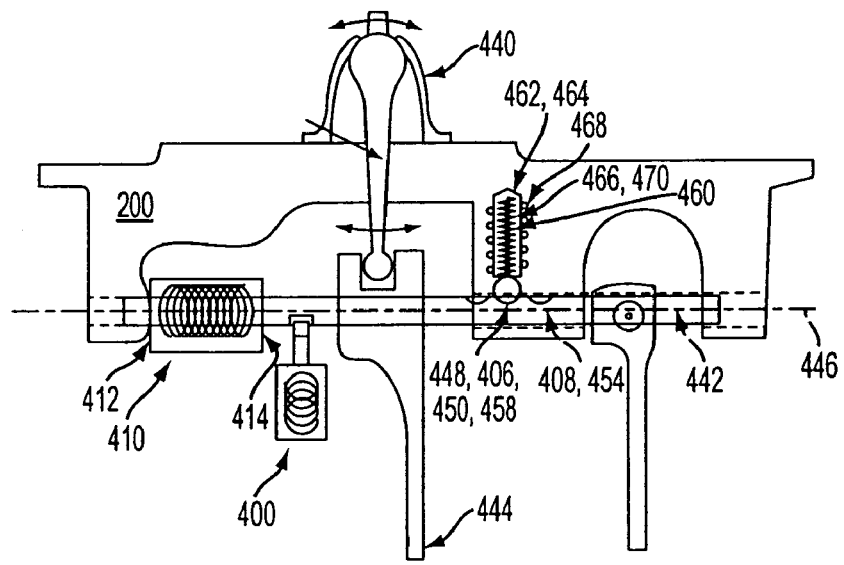
FIG. 6 is a side view of the embodiments shown in FIG. 5.
Figure 7:
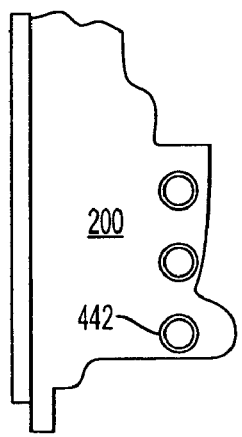
FIG. 7 is a rear view of the embodiments shown in FIG. 5.

In FIGS. 5-7 is shown a magnetic fluid shifter damper mechanism 400 for a vehicle transmission 200 according to a fourth and a fifth embodiments of the invention. With the standard setup, detents 448, which may include balls and detent springs, are the main means of holding transmission 200 in a particular gear. In the fourth and a fifth embodiments, on the other hand, magnetic fluid damper 410 may be used to hold rails 442 in a gear position along with detents 448.

In one embodiment, magnetic fluid damper 410 holds rails 442 in a gear position as long as the driver is not touching shift lever 440. In this embodiment, magnetic fluid damper 410 releases rail 442 for easy movement when the driver has his hand on shift lever 440. In the fourth embodiment, magnetic fluid damper 410 may be placed around shift rail 442, or substantially parallel to rail 442, and hold it in place magnetically. In the alternative, a solenoid could be used that pushes a plunger in and out of an additional detent 448 in rail 442 to hold or release it. In this embodiment, a touch sensitive electronic control system may control either magnetic fluid damper 410, or the solenoid, and engagement or disengagement could be done very quickly and efficiently.

In particular, in the fourth and the fifth embodiments, transmission 200 may have rails 442 that slide back and forth in the top of transmission 200. Forks 444 may be connected to these rails 442 and they slide the gears in and out of engagement with other gears to provide various gear ratios out of transmission 200. These sliding rails 442 are held into for-aft positions via a detent 448, a steel ball and a detent spring pushing on the ball.

There are typically three detents 448 on each rail 442, for example, first detent is for 1st gear, middle detent is for neutral and 3rd detent is for 2nd gear. A shift lever 440 engages rail 442 via slots in rail 442 and is used to move rail 442 back and forth into the different detent positions. Shift lever 440 also be rotated sideways (Horizontal part of "H" pattern) to move from one rail 442 to another.

The fourth and the fifth embodiments may incorporate magnetic fluid damper 410 into transmission 200 itself. In the fourth and the fifth embodiments, magnetic fluid damper 410 may hold the actual shift rails 442 inside transmission 200 from sliding instead of having an external magnetic fluid damper 110 mounted to shift lever 440. This method may be better oriented to a production solution than a magnetic fluid damper 110 applied to shift lever 440, and holds transmission 200 in gear at the source rather than just with the shift lever 440.

In particular, in the fourth and the fifth embodiments, shift linkage 402 may be a rail 442. Rail 442 may have forks 444 for translating gears or synchronizer hubs into and out of mesh with corresponding gears. In one embodiment, rail 442 may slide longitudinally inside housing 202 of transmission 200 along an axis 446 of rail 442. In this embodiment first and second positions 406, 408 may be points along a line described by rail 442.

In an alternative embodiment forks 444 of rail 442 may rotate side-to-side around axis 446 as well as longitudinally, as in the case of a manual transmission 200. In this embodiment, forks 444 may move substantially in an "H" pattern, or in several "H" patterns adjacent to each other. In this embodiment first and second positions 406, 408 may be points at the ends of the "H" pattern described by rail 442.

In the fourth embodiment, magnetic fluid damper 410 may be disposed between a substantially fixed point 412 and a support point 414 on rail 442. In several embodiments, magnetic fluid damper 410 may be a shock absorber, a snubber, or a dashpot. In one embodiment, substantially fixed point 412 may be a point on a housing 202 of transmission 200, or on a bracket associated with housing 202. In the fourth embodiment, fixed point 412 may be fixed in translation, but capable of rotation.

In the fifth embodiment, magnetic fluid shifter detent mechanism 400 may include a rail 442 having a first positional detent groove 450 located at a first position 406 on rail 442 and a second positional detent groove 454 located at a second position 408 on rail 442. Magnetic fluid shifter detent mechanism 400 may also include a positional detent pin 458 adapted to fit substantially within first or second positional detent groove 450, 454 when rail 442 is in first or second position 406, 408.

In one embodiment, a biasing device 460 may urge positional detent pin 458 against rail 442 and into first or second positional detent groove 450, 454. In several embodiments, biasing device 460 may be a spring, a solenoid, a pneumatic actuator, or a hydraulic actuator. In one embodiment, a magnetic fluid damper 462 may be disposed between a substantially fixed point 464 and a support point 466 on positional detent pin 458. In this embodiment, magnetic fluid damper 462 may contain fluid 470 inside magnetic fluid damper 462.

Fluid 470 may resist substantially a motion of support point 466 relative to substantially fixed point 464 in the presence of a magnetic field 468. In this embodiment, magnetic field 468 may be applied substantially to fluid 464 when positional detent pin 458 is in substantially first or second position 406, 408, and magnetic field 468 may be removed substantially from fluid 464 when positional detent pin 458 is substantially between first and second position 406, 408.

The presently described gear shift mechanism may allow for the design of shift levers with higher offsets, thereby allowing some combinations that could not be offered in the past, and allowing for more flexibility in shift stick placement in the cab or through the cab floor. The system fail safe mode (no power to the electromagnet) would still allow for normal easy shift lever movement.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While the invention has been described in detail above, the invention is not intended to be limited to the specific embodiments as described. It is evident that those skilled in the art may now make numerous uses and modifications of and departures from the specific embodiments described herein without departing from the inventive concepts.

While various embodiments of the present invention have been described above, they should be understood to have been presented by way of examples only, and not limitation. Thus, the breadth and scope of the present invention should not be limited by the above described embodiments.

Obviously, numerous modifications and variations of the present invention are possible in light of the above teachings. It is therefore to be understood that the invention may be practiced otherwise than as specifically described herein.

What is claimed is:

1. A magnetic fluid shifter damper mechanism for a vehicle transmission comprising:
   a shift linkage having a first position and a second position;
   a magnetic fluid damper disposed between a substantially fixed point and a support point on said shift linkage, a fluid inside said magnetic fluid damper resisting substantially a motion of said support point relative to said substantially fixed point in the presence of a magnetic field;
   wherein said magnetic field is applied to said fluid when said shift linkage is in said first and when said shift linkage is in said second position;
   and wherein said magnetic field is removed substantially from said fluid when said shift linkage is between said first and said second position.

2. The magnetic fluid shifter damper mechanism for a vehicle transmission of claim 1, comprising further a switch, said switch controlling the application of said magnetic field.

3. The magnetic fluid shifter damper mechanism for a vehicle transmission of claim 2, wherein said switch comprises a touch sensitive switch, said touch sensitive switch detecting contact between an operator and said switch to remove said magnetic field.

4. The magnetic fluid shifter damper mechanism for a vehicle transmission of claim 2, wherein said switch is disposed at a control end of said shift lever.

5. The magnetic fluid shifter damper mechanism for a vehicle transmission of claim 1, wherein when said shift linkage comprises a shift lever having a pivot, and said support point is substantially distal from said pivot.

6. The magnetic fluid shifter damper mechanism for a vehicle transmission of claim 1, wherein when said shift linkage comprises a rail.

7. The magnetic fluid shifter damper mechanism for a vehicle transmission of claim 1, wherein said fluid is a magneto-rheological fluid.

8. The magnetic fluid shifter damper mechanism for a vehicle transmission of claim 1, comprising further an electromagnet disposed proximate to said fluid, said electromagnet applying said magnetic field.

9. The magnetic fluid shifter damper mechanism for a vehicle transmission of claim 1, wherein said substantially fixed point is on a housing of said transmission.

10. The magnetic fluid shifter damper mechanism for a vehicle transmission of claim 1, wherein said magnetic fluid damper comprises:
a cylinder containing said fluid;
a drag element disposed in said fluid;
a vent aperture to vent said fluid through said drag element; and
an arm protruding from said drag element;
wherein said arm is connected to said support point and said cylinder is connected to said substantially fixed point.

11. The magnetic fluid shifter damper mechanism for a vehicle transmission of claim 1, wherein said substantially fixed point and said support point comprise ball joints or revolute joints.

12. The magnetic fluid shifter damper mechanism for a vehicle transmission of claim 1, wherein said system comprises a fail safe mode in which the magnetic field is not applied.

13. A method of magnetic fluid damping a shifter mechanism for a vehicle transmission comprising:
applying a magnetic field to a fluid of a magnetic fluid damper to hold a shift linkage in a first position;
removing substantially said magnetic field;
moving said shift linkage to substantially a second position;
applying substantially said magnetic field to said fluid of said magnetic fluid damper to hold said shift linkage in substantially said second position.

14. The method of magnetic fluid damping a shifter mechanism for a vehicle transmission of claim 13, wherein said applying said magnetic field comprises breaking contact with a shift lever.

15. The method of magnetic fluid damping a shifter mechanism for a vehicle transmission of claim 13, wherein said removing substantially said magnetic field comprises establishing contact with a shift lever.

16. A system for magnetic fluid damping a shifter mechanism for a vehicle transmission comprising:
means for applying a magnetic field to a fluid of a magnetic fluid damper to hold a shift linkage in a first position;
means for removing substantially said magnetic field;
means for moving said shift linkage to substantially a second position;
means for applying substantially said magnetic field to said fluid of said magnetic fluid damper to hold said shift linkage in substantially said second position.

17. The system for magnetic fluid damping a shifter mechanism for a vehicle transmission of claim 16, wherein said means for applying said magnetic field comprises means for breaking contact with a shift lever.

18. The system for magnetic fluid damping a shifter mechanism for a vehicle transmission of claim 16, wherein said means for removing substantially said magnetic field comprises means for establishing contact with a shift lever.

19. A magnetic fluid damper detent mechanism for a vehicle transmission comprising:
a rail having a first positional detent groove located at a first position on said rail and a second positional detent groove located at a second position on said rail;
a positional detent pin adapted to fit within said first positional detent groove when said rail is in said first position and to fit in said second positional detent groove when said rail is in said second position; and
a biasing device that urges said positional detent pin against said rail and into said first positional detent groove when said rail is in said first position and into said second positional detent groove when said rail is in said second position;
a magnetic fluid-damper disposed between a substantially fixed point and a support point on said positional detent pin, a fluid inside said magnetic fluid damper resisting substantially a motion of said support point relative to said substantially fixed point in the presence of a magnetic field;
wherein said magnetic field is applied substantially to said fluid when said positional detent pin is in said first position and when said positional detent pin is in said second position; and
wherein said magnetic field is removed substantially from said fluid when said positional detent pin is substantially between said first and said second position.

20. The magnetic fluid damper detent mechanism for a vehicle transmission of claim 19, wherein said biasing device is selected from the group consisting of: a spring, a solenoid, a pneumatic actuator, and a hydraulic actuator.

21. The magnetic fluid shifter damper mechanism for a vehicle transmission of claim 1, wherein said shift linkage is operable to move in a substantially "H" pattern.

22. The magnetic fluid shifter damper mechanism for a vehicle transmission of claim 1, wherein neither said first position nor said second position is a park position.

23. The method of magnetic fluid damping a shifter mechanism for a vehicle transmission of claim 13, wherein said shift linkage is operable to move in a substantially "H" pattern.

24. The method of magnetic fluid damping a shifter mechanism for a vehicle transmission of claim 13, wherein neither said first position nor said second position is a park position.

25. The system for magnetic fluid damping a shifter mechanism for a vehicle transmission of claim 16, wherein said shift linkage is operable to move in a substantially "H" pattern.

26. The system for magnetic fluid damping a shifter mechanism for a vehicle transmission of claim 16, wherein neither said first position nor said second position is a park position.

27. The magnetic fluid damper detent mechanism for a vehicle transmission of claim 19, wherein said rail is in a substantially "H" pattern.

28. The magnetic fluid damper detent mechanism for a vehicle transmission of claim 19, wherein neither said first position nor said second position is a park position.

* * * * *